March 13, 1934.    I. TROFIMOFF    1,950,705
BY-PASSING DEVICE FOR IDLE RUNNING STEAM ENGINES
Filed March 29, 1927    2 Sheets-Sheet 1
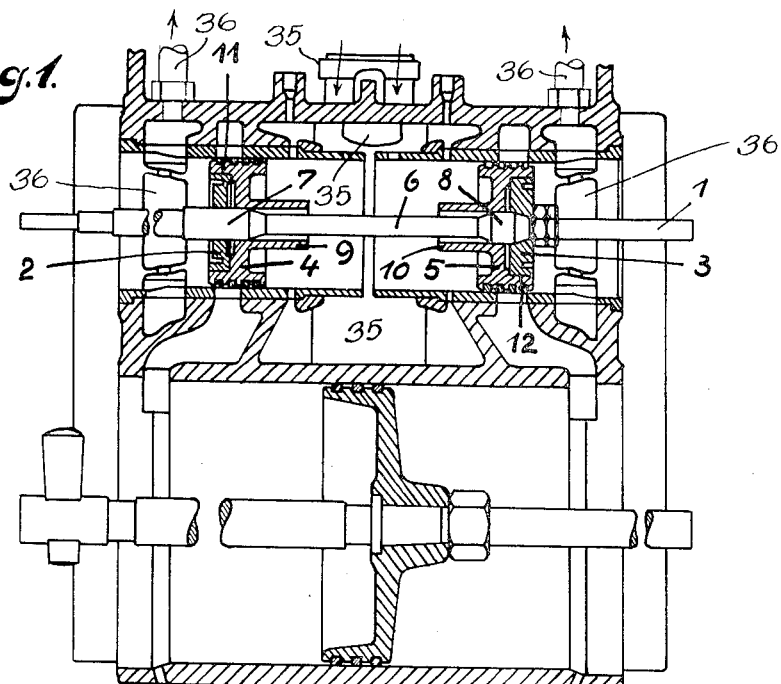
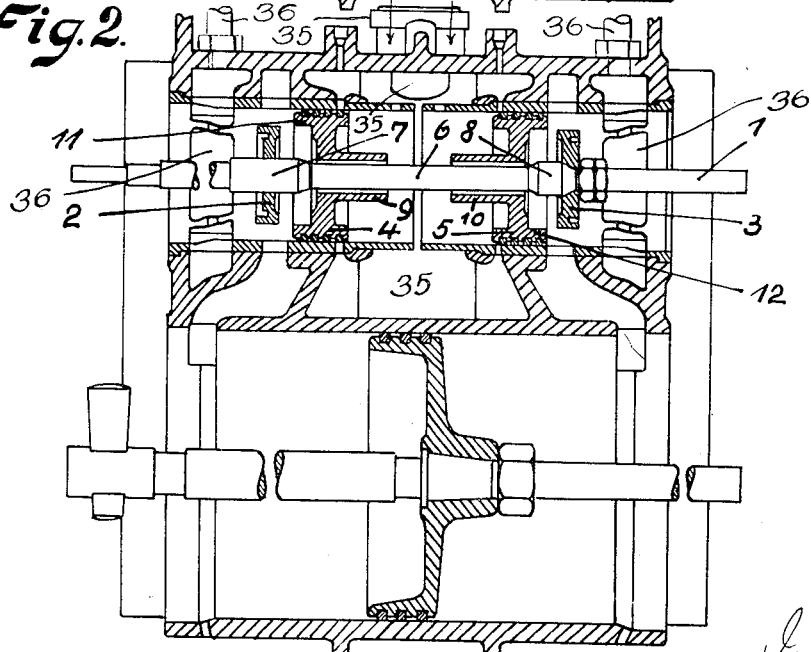

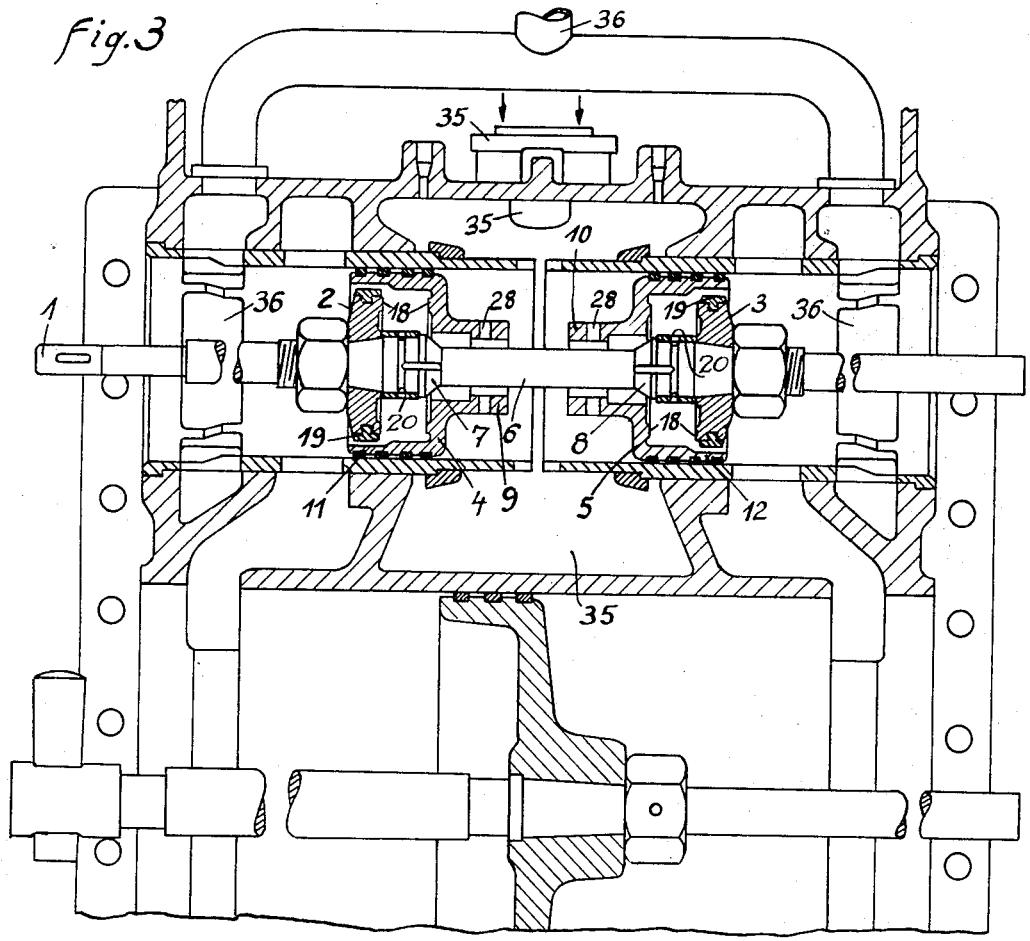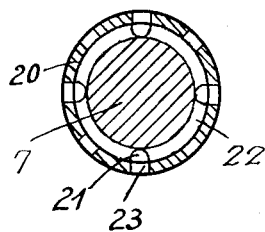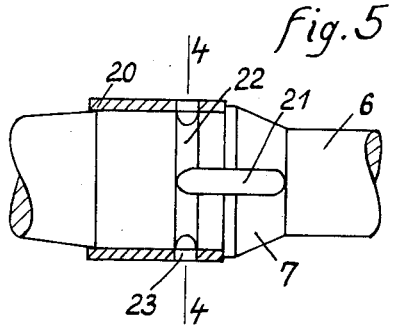

Patented Mar. 13, 1934

1,950,705

UNITED STATES PATENT OFFICE 1,950,705

BY-PASSING DEVICE FOR IDLE RUNNING STEAM ENGINES

Iwan Trofimoff, Moskau, Russia

Application March 29, 1927, Serial No. 179,326.
In Union of Soviet Socialist Republics (Russia)
September 15, 1924

3 Claims. (Cl. 121—133)

The invention relates to a by-passing device for idle running steam engines with piston valves.

It is known to provide for idle running steam engines with piston valves, especially for locomotives, the piston valves slidably on their rod, so as to form a by-pass. In working position the steam presses the piston valves against stop plates fastened on the rod, so that they form together a rigid system. In idle running position with the steam admission stopped the plates push both piston valves into the position at the dead centre, where they remain. It is also known to provide springs between the piston valves and the plates in order to lessen the shock at the moment of steam admission, but the springs often break.

The invention consists in providing the piston valves with collar like rims, forming a recess into which the stop plates fit. The admission steam caught in said recess between the piston valve and the stop plate absorbs the shock by a cushion like effect. Hereby the life of the piston valves is augmented, breakages are prevented, and the running of the piston valves becomes smooth and easy.

A further improvement consists therein, that the piston valve rod in its middle part has a smaller diameter than the bore of the piston valve, while near the stop plates, where the steam cushion effect begins, the diameters of the piston valve bore and rod are the same. This arrangement enables the steam entering by leakage between the piston valves to escape into the exhaust.

A further improvement consists therein, that the stop plates fit tightly in the recesses of the piston valves, separate steam throttling grooves being provided on the rod or the piston valves. A sure cushion effect is obtained and shocks are safely avoided even for high speed engines and for high steam pressures.

The invention is illustrated in the accompanying drawings by way of example in longitudinal sections of a steam cylinder.

Fig. 1 shows a piston valve gear in working position, both piston valves being pressed by the steam against the stop plates fixed on the rod.

Fig. 2 shows the gear in idle running position with the piston valves moved near to each other by the stop plates.

Fig. 3 shows a modification of the piston valve gear in idle running position, i. e. with no steam admitted, Figs. 4 and 5 are cross section and longitudinal section of the thicker part of the piston valve rod.

On a rod 1 between the fixed stop plates 2 and 3 two piston valves 4 and 5 are provided. The rod 1 has in its middle part 6 a smaller diameter, than in the parts 7 and 8, where the stop plates 2 and 3 are rigidly connected with the rod by being shrunk thereon, and the diameter of the rod fits the bore of the piston valve. The piston valves are provided with guiding hubs 9 and 10. Collar like rims 11, 12 of the piston valves 4, 5 fit tightly over the stop plates 2, 3 in such a manner, that a shock is absorbed by the cushion like effect of the steam inclosed in the recess between the piston valve and the stop plate.

If the steam supply is cut off and therefore the piston valves are brought by the stop plates into the idle running position according to Fig. 2 the steam admitted through the inlet 35 between the piston valves 4 and 5 in consequence of leakage of the regulator can escape under throttling into the exhaust 36 through the circular space between the hubs 9, 10 and the rod part 6. Said circular space has the further advantage, that no friction between the hubs 9, 10 and the rod part 6 arises in idle running position of the gear. When the regulator is opened and fresh steam admitted, the steam presses the piston valves, 4, 5 against the stop plates 2, 3, the hubs 9, 10 slide on the rod parts 7, 8 and further escaping of steam into the exhaust is stopped.

According to Figs. 3–5 the stop plates 2, 3 and the piston valves 4, 5 are provided with seats 18 for tightening in the manner of poppet valves. The stop plates 2, 3 are provided on their circumference with bronze rings 19, with a ground fit in the rims 11, 12 of the piston valves.

The enlargements 7, 8 of the piston valve rod are covered by bronze sleeves 20, which fit tightly in the hubs 9, 10. Longitudinal grooves 21 of the enlargements 7, 8 extend to the circular grooves 22, and in line with said circular grooves 22 in the bronze sleeves 20 openings 23 are provided.

When the steam admission is stopped the piston valves 4, 5 remain in the position according to Fig. 3, as they are not pressed against the stop plates 2, 3. When steam is admitted, the piston valves approach the stop plates and close an air or steam space by the tight fit between the parts 2, 11 and 7, 9 respectively on one side and the parts 3, 12 and 8, 10 respectively on the other side. Said space is emptied slowly through the grooves 21, 22 and the openings 23, till said openings 23 are covered by the hubs 9, 10. From this moment the seats 18 approach slowly till they contact. The approaching movement of the piston valves 4, 5 and the stop plates 2, 3 is firstly quick, then retarded till the contact of the seats is made absolutely without any shock.

I claim:

1. By-passing devices for idle running steam engines, comprising in combination a piston valve box having a middle steam inlet, two piston valves each having a collar like rim and a hub bore and being freely axially slidable in said valve box, a piston valve rod axially displaceable in said hub bores of said piston valves, and two stop plates fixed on said piston valve rod, said stop plates being free from said rims in idle running position of said piston valves and arranged to closely fit into said rims so as to enclose steam spaces for damping the shock arising by the piston valves travelling axially against said stop plates, said piston valve rod having a middle part of a reduced diameter and enlarged parts near the stop plates, and the said piston valve hub bores fitting to said enlarged parts and extending over such a distance from said stop plates, that said bores are closed as soon as the rims overrun said stop plates.

2. A by-passing device for idle running steam engines, comprising in combination a piston valve box having a middle steam inlet, two piston valves each having a collar-like rim and a hub bore and being freely axially slidable in said valve box, a piston valve rod axially displaceable in said hub bores of said piston valves, and two stop plates fixed on said piston valve rod, said stop plates being free from said rims in idle running position of said piston valves and arranged to closely fit into said rims so as to enclose steam spaces for damping the shock arising by the piston valves traveling axially against said stop plates, said piston valve rod having enlargements thereon adjoining the stop plates so as to tightly fit into the hub bores of the piston valves and provided with longitudinal grooves open to the steam inlet and circular grooves connected with said longitudinal grooves, said circular grooves being open to the spaces between said piston valves and stop plates.

3. By-passing device for idle running steam engines, comprising in combination a piston valve box having a middle steam inlet, two piston valves each having a collar like rim and a hub bore and being freely axially slidable in said valve box, a piston valve rod axially displaceable in said hub bores of said piston valves, and two stop plates fixed on said piston valve rod, said stop plates being free from said rims in idle running position of said piston valves and arranged to closely fit into said rims so as to enclose steam spaces for damping the shock arising by the piston valves travelling axially against said stop plates, enlargements provided on the piston valve rod adjoining the stop plates, longitudinal grooves open to the steam inlet, circular grooves connected with said longitudinal grooves, sleeves provided on said enlargements and tightly fitting into the hub bores of the piston valves for covering said circular grooves, and connecting grooves leading from said circular grooves into the space between the piston valves and stop plates.

IWAN TROFIMOFF.